(12) United States Patent
Mitra et al.

(10) Patent No.: US 7,490,137 B2
(45) Date of Patent: Feb. 10, 2009

(54) VECTOR-BASED SENDING OF WEB CONTENT

(75) Inventors: Asim Mitra, Andhra Pradesh (IN); Thomas Deml, Kirkland, WA (US); Anil Ruia, Bellevue, WA (US); Bilal Alam, Sammamish, WA (US); Wade Hilmo, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 10/392,420

(22) Filed: Mar. 19, 2003

(65) Prior Publication Data

US 2003/0182397 A1 Sep. 25, 2003

Related U.S. Application Data

(60) Provisional application No. 60/366,882, filed on Mar. 22, 2002.

(51) Int. Cl.
*G06F 15/16* (2006.01)
*G06F 12/00* (2006.01)
*G06F 13/00* (2006.01)
*G06F 13/28* (2006.01)

(52) U.S. Cl. .................. 709/219; 709/215; 711/100
(58) Field of Classification Search .............. 709/218, 709/219, 215; 711/100
See application file for complete search history.

(56) References Cited

U.S. PATENT DOCUMENTS

| | | | |
|---|---|---|---|
| 5,146,593 A | 9/1992 | Brandle et al. | |
| 5,155,837 A | 10/1992 | Liu et al. | |
| 5,535,322 A | 7/1996 | Hecht | |
| 5,590,266 A | 12/1996 | Carson et al. | |
| 5,706,507 A | 1/1998 | Schloss | |
| 5,715,386 A | 2/1998 | Fulton, III et al. | |
| 5,918,226 A * | 6/1999 | Tarumi et al. | 707/10 |
| 5,920,867 A | 7/1999 | Van Huben et al. | |
| 5,920,873 A | 7/1999 | Van Huben et al. | |
| 5,930,830 A * | 7/1999 | Mendelson et al. | 711/171 |
| 6,023,702 A | 2/2000 | Leisten et al. | |
| 6,067,580 A | 5/2000 | Aman et al. | |
| 6,094,654 A | 7/2000 | Van Huben et al. | |
| 6,098,064 A | 8/2000 | Pirolli et al. | |
| 6,112,196 A | 8/2000 | Zimowski et al. | |
| 6,188,698 B1 | 2/2001 | Galand et al. | |
| 6,209,018 B1 | 3/2001 | Ben-Shachar et al. | |
| 6,212,573 B1 | 4/2001 | Lim et al. | |

(Continued)

OTHER PUBLICATIONS

Li et al., "An Approach for Estimation of Software Aging in a Web Server", 2002, 10 pages, IEEE.

(Continued)

*Primary Examiner*—Jason D Cardone
*Assistant Examiner*—Brian J Gillis
(74) *Attorney, Agent, or Firm*—Lee & Hayes, PLLC

(57) ABSTRACT

A web server arrangement includes user-mode web application logic that is configured to receive a web request and process the web request and generate a web request response. Vector send logic is then employed to identify a location of content of the web request response using a vector array. Kernel-mode vector receive logic then assembles the web request response in a contiguous section of kernel-mode or other like memory based on the vector array. Kernel mode universal listener logic then sends the assembled web request response to the requesting client application logic.

12 Claims, 5 Drawing Sheets

U.S. PATENT DOCUMENTS

| | | | |
|---|---|---|---|
| 6,219,760 B1 | 4/2001 | McMinn |
| 6,223,202 B1 | 4/2001 | Bayeh |
| 6,223,207 B1 | 4/2001 | Lucovsky et al. |
| 6,289,458 B1 | 9/2001 | Garg et al. |
| 6,327,594 B1 | 12/2001 | Van Huben et al. |
| 6,339,771 B1 | 1/2002 | Zimowski et al. |
| 6,389,421 B1 | 5/2002 | Hawkins et al. |
| 6,463,465 B1 | 10/2002 | Nieuwejaar |
| 6,542,920 B1 | 4/2003 | Belkin et al. |
| 6,574,712 B1 | 6/2003 | Kahle et al. |
| 6,594,784 B1 | 7/2003 | Harper et al. |
| 6,604,106 B1 | 8/2003 | Bodin et al. |
| 6,622,168 B1 | 9/2003 | Datta |
| 6,629,266 B1 | 9/2003 | Harper et al. |
| 6,636,900 B2 | 10/2003 | Abdelnur |
| 6,671,716 B1 | 12/2003 | Diedrichsen et al. |
| 6,732,138 B1 | 5/2004 | Browning et al. |
| 6,810,495 B2 | 10/2004 | Castelli et al. |
| 6,820,215 B2 | 11/2004 | Harper et al. |
| 6,941,379 B1 | 9/2005 | Dingsor et al. |
| 6,978,398 B2 | 12/2005 | Harper et al. |
| 6,990,513 B2 | 1/2006 | Belfiore et al. |
| 7,028,091 B1 | 4/2006 | Tripathi et al. |
| 7,028,312 B1 | 4/2006 | Merrick et al. |
| 7,107,329 B1 | 9/2006 | Schroder et al. |
| 7,330,483 B1 | 2/2008 | Peters, Jr. et al. |
| 7,356,803 B2 | 4/2008 | Bau, III et al. |
| 2001/0010053 A1 | 7/2001 | Ben-Shachar et al. |
| 2002/0047899 A1 | 4/2002 | Son et al. |
| 2002/0059425 A1 | 5/2002 | Belfiore et al. |
| 2002/0062372 A1 | 5/2002 | Hong et al. |
| 2002/0065900 A1 | 5/2002 | Dor et al. |
| 2002/0069420 A1 | 6/2002 | Russell et al. |
| 2002/0073132 A1 | 6/2002 | Van Garderen et al. |
| 2002/0078174 A1 | 6/2002 | Sim et al. |
| 2002/0083214 A1 | 6/2002 | Heisig et al. |
| 2002/0087612 A1 | 7/2002 | Harper et al. |
| 2002/0087797 A1 | 7/2002 | Adrangi |
| 2002/0120710 A1 | 8/2002 | Chintalapati et al. |
| 2002/0129123 A1* | 9/2002 | Johnson et al. ............ 709/219 |
| 2002/0147823 A1 | 10/2002 | Healy |
| 2002/0147966 A1 | 10/2002 | Frazier |
| 2002/0152328 A1* | 10/2002 | Kagan et al. ............... 709/250 |
| 2002/0161908 A1* | 10/2002 | Benitez et al. ............. 709/231 |
| 2003/0005122 A1 | 1/2003 | Freimuth et al. |
| 2003/0005181 A1 | 1/2003 | Bau et al. |
| 2003/0023957 A1 | 1/2003 | Bau et al. |
| 2003/0061378 A1* | 3/2003 | Mazzitelli ................... 709/238 |
| 2003/0079154 A1 | 4/2003 | Park et al. |
| 2003/0084018 A1 | 5/2003 | Chintalapati et al. |
| 2003/0135484 A1 | 7/2003 | Mourad et al. |
| 2003/0135542 A1 | 7/2003 | Boudreau |
| 2003/0182400 A1 | 9/2003 | Karagounis et al. |
| 2004/0205048 A1 | 10/2004 | Pizzo et al. |
| 2004/0205769 A1 | 10/2004 | Ruutu |
| 2005/0021689 A1 | 1/2005 | Marvin et al. |
| 2005/0235290 A1 | 10/2005 | Jefferson et al. |
| 2005/0246415 A1 | 11/2005 | Belfiore et al. |
| 2007/0078995 A1 | 4/2007 | Benard et al. |
| 2007/0204279 A1 | 8/2007 | Warshavsky et al. |

OTHER PUBLICATIONS

Mercer et al., "Processor Capacity Reserves: An Abstraction for Managing Processor Usage", Workstation Operating Systems, 1993. Proceedings. Fourth Wordshop on Oct. 14-15, 1993, pp. 129-134.

Zhou et al., "Processor Pool-Based Scheduling for Large-Scale NUMA Multiprocessors", Joint International Conference on Measurement and Modeling of Computer Systems, pp. 133-142, Year of Publication: 1991.

Caucho Servlet Engine on Apache Unix, Mar. 12, 2008 at <<http://web.archive.org/web/2001040144529/caucho.com/products/resin/ref/cs3-apache-unix.xtp>>, Caucho, 1998-2001, pp. 1-6.

"Web Application: Servlets and Filters" retrieved on Mar. 12, 2008 at <<http://www.caucho.com/resin-3.0/config/webapp.xtp>>, Caucho Technologies Inc, 1998-2006, pp. 1-21.

* cited by examiner

VECTOR-BASED SENDING OF WEB CONTENT

RELATED PATENT APPLICATIONS

This U.S. Patent Application further claims the benefit of priority from, and hereby incorporates by reference the entire disclosure of, co-pending U.S. Provisional Patent Application Ser. No. 60/366,882, filed Mar. 22, 2002, and titled "Vector Send".

TECHNICAL FIELD

The present invention relates generally to computers and like devices, and more particularly to methods, apparatuses and systems for web applications and web servers.

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected the user typically accesses information available therein by using a web browser or like application. A web browser is configured to access web pages that are provided through the Internet by other computers. For example, one or more web server computers may be connected to the Internet and configured with one or more web sites or other supporting web applications. A web site typically has one or more static web pages and/or is capable of supplying one or more dynamically generated web pages that the user may selectively download, view and possible interact with.

To identify a particular web site/page the user will typically select a hyper link to the desired web site/page or may choose to manually enter a unique name for the web site/page. The most common name used for identifying a web site/page is known as the uniform resource locator (URL). By entering a URL, the user will be connected to an appropriate web server which hosts the applicable web application(s), and the requested web page will be downloaded, in this case using a hypertext transfer protocol (HTTP), to the web browser. Within the Internet itself, the selected URL is associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

A web server application typically receives the web request from the web browser and provides it to a web application or worker process. The worker process responds to the web request and eventually generates a web request response that is then sent back to the web browser.

There is a continuing desire to provide a quick response from the worker process and to make good use of available web server resources. One bottleneck that has existed in many web servers are delays associated with preparing the web request response to be sent back to the web browser(client). Here, for example, for various reasons, portions of the web request response may be spread apart within the web server's memory. As such, before the web server can send the response to the client there is a need to assemble these portions into a contiguous section of memory. This is a burden on the web server's resources, such as the memory, and also requires a certain amount of time to perform.

As such, there is need for improved methods, apparatuses and systems that provide for improved web request response handling.

SUMMARY

Methods, apparatuses and systems are provided, which significantly improve web request response handling in web servers and other like server devices.

The above stated needs and others are met, for example, by a web server arrangement that includes user-mode web application logic configured to receive a web request and process the web request and generate a web request response. Vector send logic is then employed to identify a location(s) of content of the web request response using a vector array. Kernel-mode vector receive logic then assembles the web request response in a contiguous section of kernel-mode or other like memory based on the vector array. Kernel mode universal listener logic then sends the assembled web request response to the requesting client application logic.

BRIEF DESCRIPTION OF THE DRAWINGS

A more complete understanding of the various methods, apparatuses and systems of the present invention may be had by reference to the following detailed description when taken in conjunction with the accompanying drawings wherein.

DESCRIPTION

Figure 1:
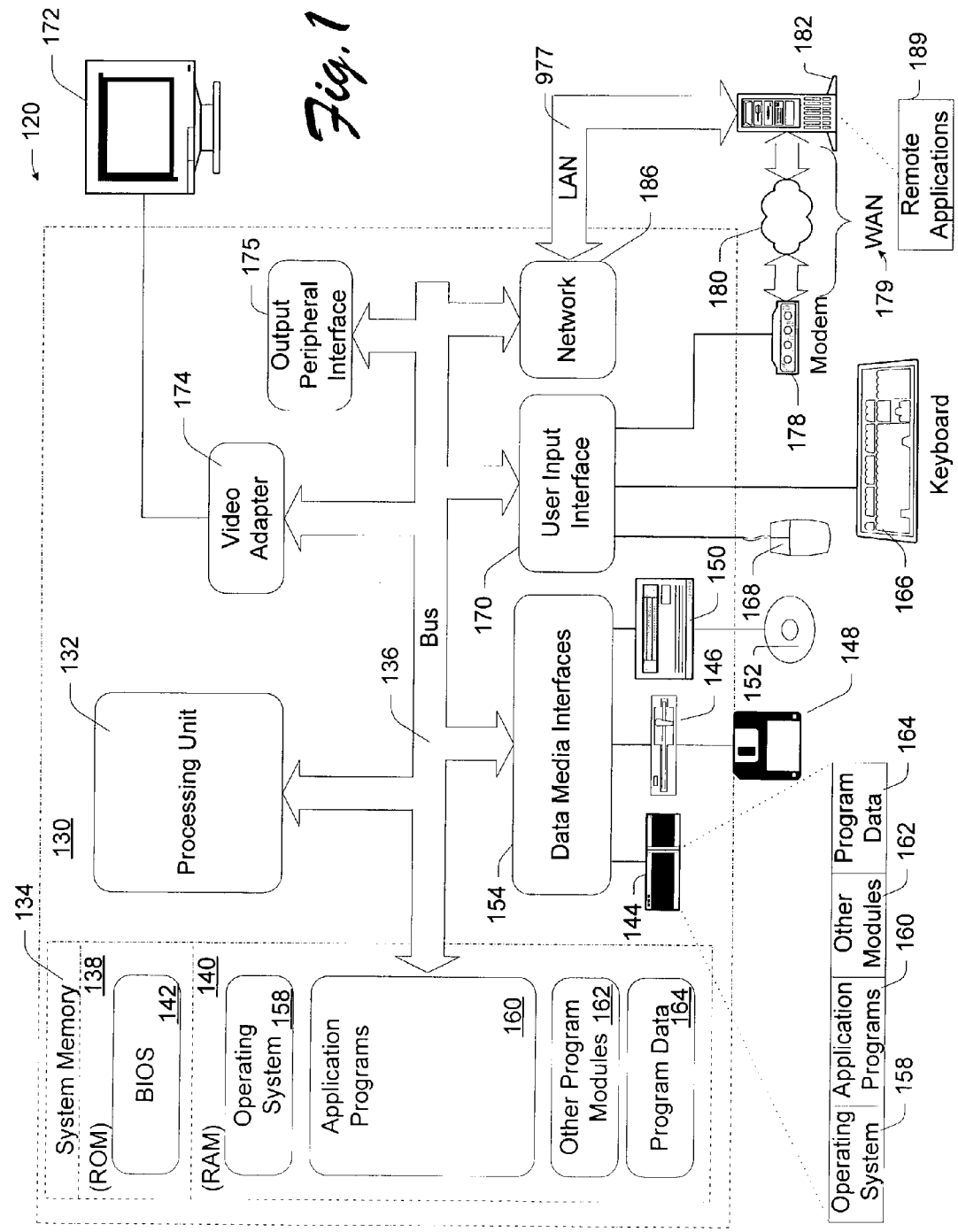
FIG. 1 is a block diagram that depicts an exemplary device, in the form of a computer, which is suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a server computer, which may take the form of a personal computer, a workstation, a dedicated server, a plurality of processors, a mainframe computer, etc. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
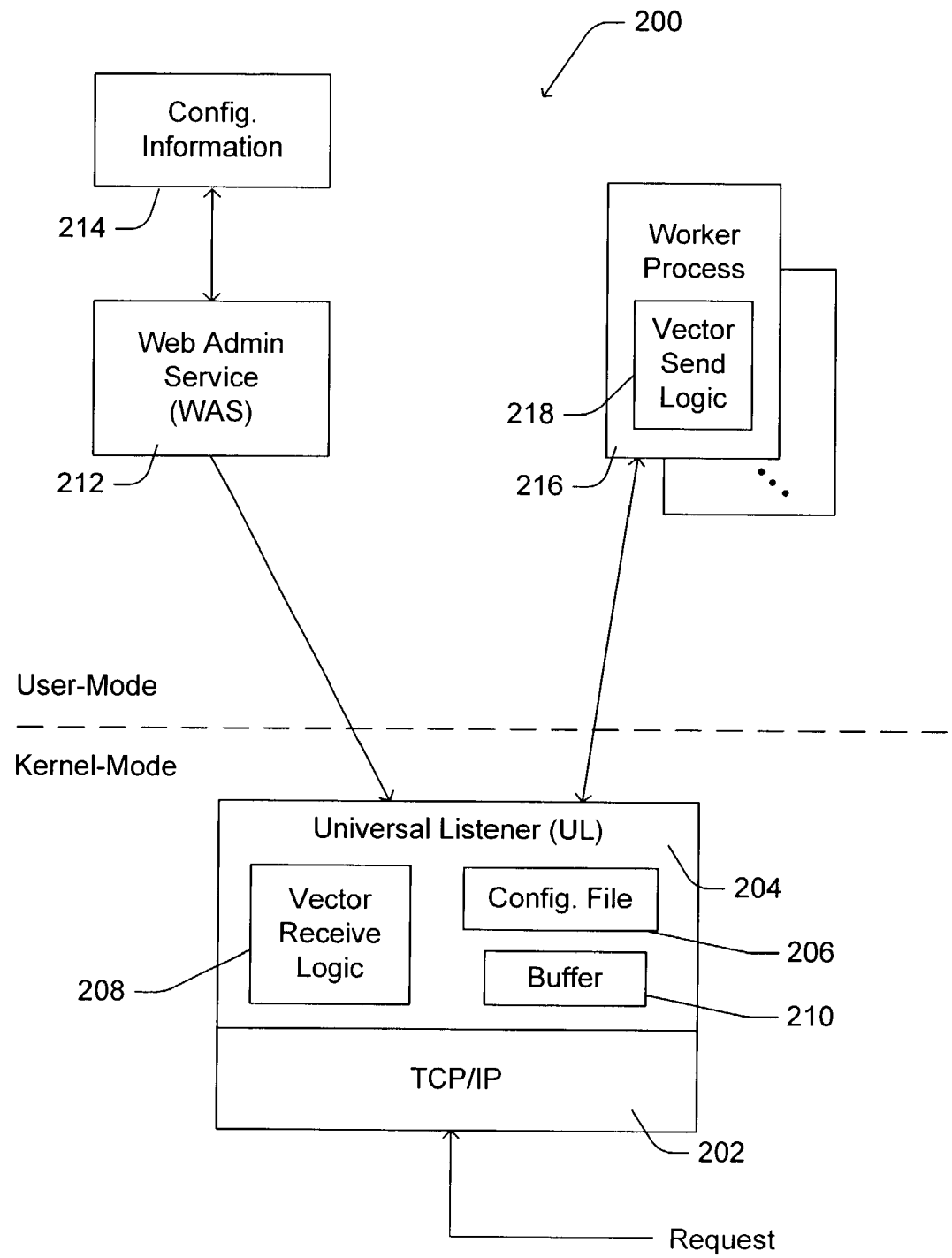
FIG. 2 is a block diagram depicting certain kernel-mode and user-mode processes, including a kernel-mode universal listener (UL) service, vector send logic and vector receive logic associated with an improved web server in accordance with certain exemplary implementations of the present invention.

Attention is drawn to the exemplary improved web server arrangement 200 that is depicted in FIG. 2. Here, as shown and described below, certain functions have been determined and designed to be handled by either kernel-mode processes or user-mode processes. In the past, web servers tended to be strictly user-mode processes.

With this in mind, improved web server arrangement 200 includes a kernel-mode universal listener (UL) service 204, which is provided on top of TCP/IP service 202. UL service 204 includes or otherwise is configured to access a configuration file 206. For purposes of simplicity, in this example configuration file 206 is illustrated as being logically within the representative block of UL service 204.

Configuration file 206 is configured to support a decision process that determines which, if any, user-mode process should handle a request as received via TCP/IP service 202. Rather than examining the extension-identifying portion of the URL in the received request to make such a determination, UL service 204 and configuration file 206 are configured to examine the hierarchical formatted information in the URL. The resulting decision will then cause UL service 204 to either deny the request or provide the request to a most-appropriate user-mode worker process.

UL service 204 passes the web request to a worker process 216 for further handling. Doing so essentially eliminates user-mode process hops and associated processing delays. Further, each of the user-mode processes can be supported by a private (non-shared) interface with kernel-mode UL service 204. Additionally, UL service 204 may be advantageously configured to provide improved management over such interfaces and/or the various user-mode processes.

In accordance with certain implementations, configuration file 206 is updated or otherwise managed via a user-mode Web Administration Service (WAS) process 212. As depicted, WAS process 212 is operatively associated with a configuration store 214. Configuration store 214 provides the necessary information about the structure/configuration of web server arrangement 200 to s allow for certain associations to be made between at least a portion of the available web accessible sites/pages/services provided therein and the supporting user-mode processes.

WAS process 212 maintains configuration file 206 using the associated information in configuration store 214. Thus, for example, configuration file 206 may include a listing or similar tree-like arrangement that can be quickly examined upon receiving a request based on the hierarchical portion of the URL. A plurality of data may be associated together in configuration groups such that UL service 204 can begin to systematically "walk through" the hierarchical portion of the requested URL to find the best matching configuration group and once found identify the most-appropriate application pool.

Configuration file 214 may also provide guidance or define logical rules with regard to the selection of a user-mode worker process. Thus, for example, a possible rule may prioritize the use of user-mode processes according to some scheme. One such exemplary scheme may cause UL service 204 to look for already running user-mode processes, rather than start a new user-mode process. Rules may also be provided to better manage the private interfaces and the running/halting/closing of user-mode processes.

WAS process 212 is configured to provide user administration capabilities in configuring, maintaining, or otherwise modifying all or part of configuration store 214. In certain configurations, the administrator may be able to define one or more rules or parameters that operatively affect the operation of UL service 204.

Further illustrated in FIG. 2 are kernel-mode vector receive logic 208 and user-mode vector send logic 218. In this example, vector receive logic 208 and vector send logic 218 are depicted within UL service 204 and worker process 216, respectively. This is for illustrative purposes only, as such logic may exist inside and/or outside of these processes/services in certain implementations.

Vector send logic 218 is essentially configured to generate a vector array associated with a completed web request response. This vector array identifies where, within user-mode memory, various pieces or portions of the completed web request response are located. The vector array is then provided to vector receive logic 208, which uses this identifying information to retrieve or otherwise move/copy the various portions of the completed web request response from their respective locations in the user-mode memory into kernel mode memory or other like memory. In doing so, vector receive logic 208 assembles the completed web request response into a contiguous section of memory from which it can then be sent out using lower layer protocols, etc., such as TCP/IP.

Figure 3:
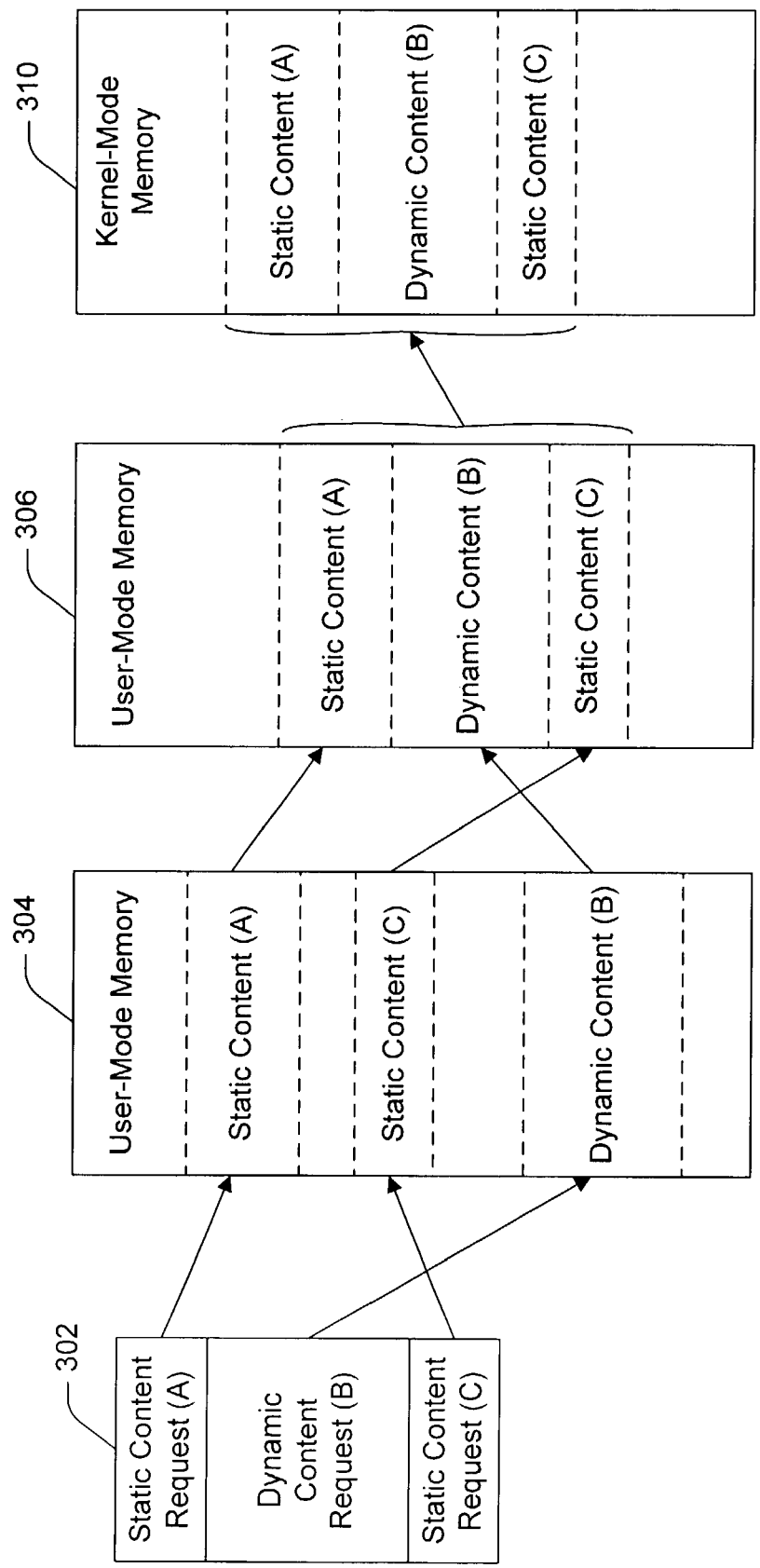
FIG. 3 is an illustrative diagram depicting a method for handling requests in a conventional web server.
Figure 4:
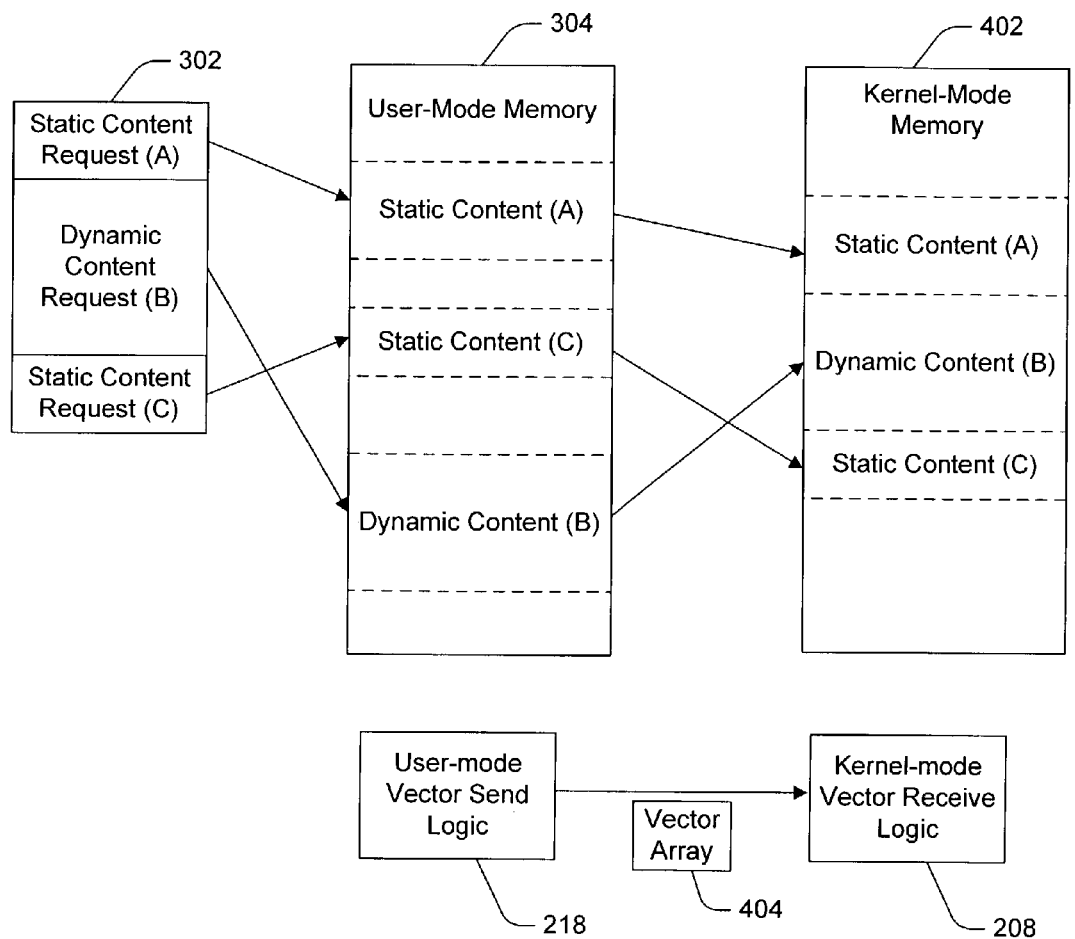
FIG. 4 is an illustrative diagram depicting a method for handling requests using an improved web server, for example, as in FIG. 2, in accordance with certain exemplary implementations of the present invention.

To illustrate a few of the benefits with web server arrangement 200, attention is drawn first to FIG. 3 and then to FIG. 4.

FIG. 3 shows some of the resources and processes that would typically take place in a conventional web server arrangement. Here, a web request 302 is received and provided to a web application for processing. Web request 302 in this example, essentially includes three parts. The first part is a request (A) for some file or static content. The second part is a request (B) for some form of scripted or other like generated content, labeled here as dynamic content. This may include, for example, a request for some type of processing, database query, etc. The third part is an additional request (C) for some other file or static content.

Based on these three exemplary sections of web request 302, the web application begins to process each of them and in this case places corresponding portions of the resulting web request response into user-mode memory 304. As shown, these portions are not located in a contiguous section of memory because, for example, the web application will likely have completed the static content requests A and C prior to completing dynamic content request B. Moreover, the web application may not have known how big a block of memory to reserve when initially starting to process web request 302 due to the variability in size of dynamic content B. Consequently, once all of the processing has been completed there is a need to reserve the correct size block of contiguous memory and to assemble the response content into that block and in a particular order. This is shown in memory 306. Next, the now contiguous web request response is transferred to kernel-mode or other like memory 310 for transmission by the protocol stack.

Turning to FIG. 4, an exemplary improved response handling process of web server arrangement 200 (FIG. 2) is depicted. Here, web request 302 is received and processed by a worker process and the resulting content is again found in user-mode memory 304. This time, however, vector send logic 218 is employed to generate a vector array 404 that identifies static content A and C, and dynamic content B within memory 304. Vector array 404 is provided to vector receive logic 208 and used to assemble the web request response in a contiguous section of kernel-mode or other like memory 402.

Thus, for example, this improved process reduced the amount of user-mode memory by 50% and eliminated the need for the additional user-mode assembly step.

Vector array 404 may include, for example, a handle, tag, identifier, or offset and a size for the static content A and also for static content C. For dynamic content B, vector array 404 may include, for example, a pointer in memory and a size. Those skilled in the art will recognize that these and/or other identifying techniques may be employed. Vector array 404 may also include a count of the number of elements identified in the array.

It should also be noted that there may be more fragmentation of response data than what is illustrated in FIG. 4.

Figure 5:
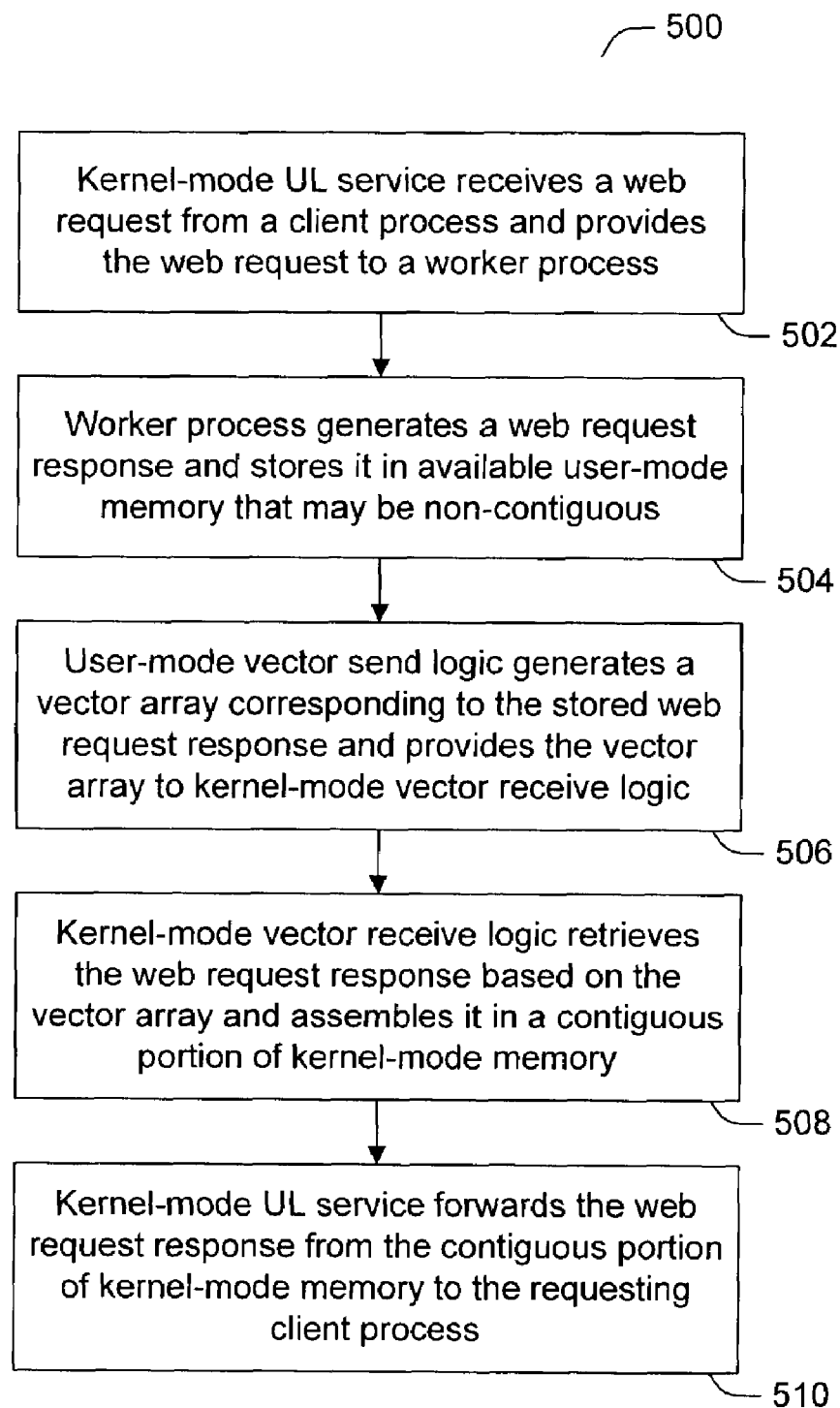
FIG. 5 is a flow diagram further depicting a method for handling requests using an improved web server, for example, as in FIG. 2, in accordance with certain exemplary implementations of the present invention.

Reference is now made to FIG. 5, which is a flow diagram of a method 500 that may be employed to handle web requests. In act 502, a kernel-mode UL service receives a web request and provides it to a worker process. The worker process generates a web request response in act 504. In act 506, vector send logic generates a vector array. In act 508, kernel-mode vector receive logic uses the vector array to assemble the web request response. In act 510, kernel-mode processes send the web request response to the client device.

Additional information is provided in the following implementations details for certain further exemplary implementations of the present invention.

As described herein, the improved techniques allow developers to specify a vector of buffers, fragments and/or even file handles, for example. In certain implementations, a function is called an HSE_REQ_VECTOR_SEND Server Support Function and using this function developers can send an entire response in one function call.

By way of example, a couple of scenarios are provided below:

Scenario 1:

The response of a custom ISAPI extension includes a header, some static content, a database query, and footer. The ISAPI developer can now send the entire response in one function call to the HSE_REQ_VECTOR_SEND Server Support Function. The developer can also send a vector of chunks to the client without having to call WriteClient multiple times.

Scenario 2:

ASP templates are provided which have a plurality of small buffers, mainly. static text buffers. ASP.DLL uses the HSE_REQ_VECTOR_SEND Server Support Function to send these buffers to the client making it much faster.

In accordance with certain exemplary implementations of the present invention, HSE_REQ_VECTOR_SEND is a Server Support Function that takes a pointer to a HSE_VECTOR_SEND structure that has to be filled before it is called.

The structure HSE_VECTOR_SEND structure is as follows:

```
typedef struct _HSE_VECTOR_SEND
{
    LPHSE_RESPONSE_ELEMENT lpElementArray;
    DWORD nElementCount,
    DWORD dwFlags;
    CHAR* pszHeaders,
    DWORD cchHeaderSize
}HSE_VECTOR_SEND, *LPHSE_VECTOR_SEND;
```

The parameters for the _HSE_VECTOR_SEND structure are described below:

LPHSE_RESPONSE_ELEMENT lpElementArray, is a pointer to a buffer of HSE_RESPONSE_PACKET structures. If an ISAPI extension wants to close the connection lpElementArray and nElementCount must be 0.

DWORD nElemenetCount is the number of elements that the HSE_RESPONSE_ELEMENT buffer contains. If the ISAPI extension wants to close the connection lpElementArray and nElementCount must be 0.

DWORD dwFlags include the following flags: HSE_IO_SYNC, HSE_IO_ASYNC, HSE_IO_DISCONNECT_AFTER_SEND, and HSE_IO_SEND_NO_HEADERS.

CHAR* pszHeaders, which is a list of headers.

DWORD cchHeaderSize, which is the length of the pszHeaders array.

The HSE_RESPONSE_ELEMENT structure is as follows:

```
Typedef struct_HSE_RESPONSE_ELEMENT {
    DWORD element_type;
    PVOID pBuffer;
    ULONGLONG cbSize;
    HANDLE hFile; (Optional)
    ULONGLONG cbFileOffset;
}HSE_RESPONSE_ELEMENT, *LPHSE_RESPONSE_ELEMENT.
```

The following is a description of each Member of the response Element when used for Vector Send SSF:

Element type: Specifies whether the element is a buffer or a file or a fragment. Fragments, for example, may be stored in a cache buffer in the UL service and used again.

pBuffer: Pointer to the data in memory to be sent. pBuffer has to be set to NULL if a File Handle or a fragment should be sent.

cbSize Specifies number of bytes to transmit. If a file is sent, cbSize specifies the bytes to be sent, beginning from the offset of the file. If a file is sent and cbSize is 0, the transmission begins from the file offset till the end of the file. If a buffer is sent, cbSize specifies the number of bytes to be sent in this buffer. If a fragment is sent, cbSize is set to NULL.

hFile: (Optional) A handle to a file. The function transmits this file's data. The transmission starts at the file offset (cbFileOffset) and sends the number of bytes specified in cbSize. pBuffer has to be NULL, if a file should be transmitted. hFile has to be NULL or INVALID_HANDLE_VALUE if a buffer or fragment should be sent.

cbFileOffset: cbFileOffset specifies an offset within the file at which to start the file data transfer. If cbFileOffset is 0, the transmission begins with the first byte of the file. If the whole file should be sent, cbFileOffset and cbSize need to be 0. If a fragment is sent, cbFileOffset is set to NULL.

What is claimed is:

1. A method comprising:
   causing a user-mode web application in a web server to:
      process a web request,
      generate a web request response having static and dynamic content, and
      store said static and dynamic content in a plurality of non-contiguous sections of user-mode memory;
   identifying said static and dynamic content within said plurality of non-contiguous sections of user-mode memory with a vector array, said vector array comprising a plurality of identifiers, each identifier associated with one of said plurality of non-contiguous sections of user-mode memory, and each identifier having an index ranging from zero to n, said vector array allowing a kernel-mode process to retrieve said static and dynamic content in said web request response from within said plurality of non-contiguous sections of user-mode memory;

causing a kernel-mode process to assemble said static and dynamic content of said web request response in a contiguous section of memory associated with said kernel-mode process based on said vector array and without first assembling said static and dynamic content into a contiguous section of user-mode memory; and causing said kernel-mode process to send said vector array to a requesting client application.

2. The method as recited in claim 1, wherein said plurality of identifiers includes at least one identifier selected from a group of identifiers comprising a pointer, a tag, a handle, an offset, a length, a size, a memory address, a disk drive location, and a buffer identifier.

3. The method as recited in claim 1, wherein user-mode vector send logic is used to identify said static and dynamic content in said web request response and generate said vector array.

4. The method as recited in claim 1, wherein kernel-mode vector receive logic is used to assemble said static and dynamic content of said web request response in said contiguous section of memory associated with said kernel-mode process based on said vector array.

5. The method as recited in claim 1, wherein said kernel-mode process includes a universal listener (UL) service.

6. One or more computer-readable media storing computer-executable instructions that, when executed on one or more processors, perform acts comprising:
   causing a user-mode web application in a web server to:
      process a web request,
      generate a web request response having static and dynamic content, and
      store said static and dynamic content in a plurality of non-contiguous sections of user-mode memory;
   identifying said static and dynamic content within said plurality of non-contiguous sections of user-mode memory with a vector array, said vector array comprising a plurality of identifiers, each identifier associated with one of said plurality of non-contiguous sections of user-mode memory, and each identifier having an index ranging from zero to n, said vector array allowing a kernel-mode process to retrieve said static and dynamic content in said web request response from within said plurality of non-contiguous sections of user-mode memory;
   causing a kernel-mode process to assemble said static and dynamic content of said web request response in a contiguous section of memory associated with said kernel-mode process based on said vector array and without first assembling said static and dynamic content into a contiguous section of user-mode memory; and
   causing said kernel-mode process to send said vector array to a requesting client application.

7. One or more computer-readable media as recited in claim 6, wherein said plurality of identifiers includes at least one identifier selected from a group of identifiers comprising a pointer, a tag, a handle, an offset, a length, a size, a memory address, a disk drive location, and a buffer identifier.

8. One or more computer-readable media as recited in claim 6, wherein user-mode vector send logic is used to identify said static and dynamic content in said web request response and generate said vector array.

9. One or more computer-readable media as recited in claim 6, wherein kernel-mode vector receive logic is used to assemble said static and dynamic content of said web request response in said contiguous section of memory associated with said kernel-mode process based on said vector array.

10. One or more computer-readable media as recited in claim 6, wherein said kernel-mode process includes a universal listener (UL) service.

11. A computer system comprising:
    one or more processors;
    memory, accessible by the one or more processors;
    a user-mode web application logic module stored in memory and executable on the one or more processors:
       receive a web request, process said web request,
       generate a web request response having static and dynamic content, and
       store said static and dynamic content in a plurality of non-contiguous sections of user-mode memory;
    cause vector send logic operatively coupled to said web application logic to identify a location within said plurality of non-contiguous sections of user-mode memory of said static and dynamic content of said web request response using a vector array, said vector array comprising a plurality of identifiers, each identifier associated with one of said plurality of non-contiguous sections of user-mode memory, and each identifier having an index ranging from zero to n, said vector array allowing a kernel-mode vector receive logic to retrieve said static and dynamic content in said web request response from within said plurality of non-contiguous sections of user-mode memory;
    cause kernel-mode vector receive logic operatively coupled to said vector send logic to copy said static and dynamic content of said web request response into a contiguous section of memory associated with said kernel-mode vector receive logic based on said vector array and without first assembling said static and dynamic content into a contiguous section of user-mode memory; and
    cause a kernel-mode universal listener logic configured to send said web request response to a requesting client application.

12. The computer system as recited in claim 11, wherein said plurality of identifiers includes at least one identifier selected from a group of identifiers comprising a pointer, a tag, a handle, an offset, a length, a size, a memory address, a disk drive location, and a buffer identifier.

* * * * *

UNITED STATES PATENT AND TRADEMARK OFFICE
CERTIFICATE OF CORRECTION

| | |
|---|---|
| PATENT NO. | : 7,490,137 B2 |
| APPLICATION NO. | : 10/392420 |
| DATED | : February 10, 2009 |
| INVENTOR(S) | : Asim Mitra et al. |

It is certified that error appears in the above-identified patent and that said Letters Patent is hereby corrected as shown below:

In column 10, line 19, in Claim 11, delete "processors:" and insert -- processors to: --, therefor.

Signed and Sealed this
Third Day of May, 2011

David J. Kappos
*Director of the United States Patent and Trademark Office*